US008648149B2

(12) United States Patent
Lehmann et al.

(10) Patent No.: US 8,648,149 B2
(45) Date of Patent: *Feb. 11, 2014

(54) RADICALLY COUPLED PTFE POLYMER COMPOUNDS AND METHOD FOR THE PRODUCTION THEREOF

(75) Inventors: Dieter Lehmann, Coswig (DE); Bernd Kluepfel, Schonungen (DE)

(73) Assignee: Leibniz-Institut fuer Polymerforschung Dresden E.V., Dresden (DE)

( * ) Notice: Subject to any disclaimer, the term of this patent is extended or adjusted under 35 U.S.C. 154(b) by 151 days.

This patent is subject to a terminal disclaimer.

(21) Appl. No.: 12/795,322

(22) Filed: Jun. 7, 2010

(65) Prior Publication Data

US 2010/0249333 A1    Sep. 30, 2010

Related U.S. Application Data

(63) Continuation of application No. 10/577,619, filed as application No. PCT/EP2004/052619 on Oct. 22, 2004, now Pat. No. 7,759,441.

(30) Foreign Application Priority Data

Oct. 30, 2003   (DE) ................... 103 51 814

(51) Int. Cl.
    *C08F 14/26*   (2006.01)
(52) U.S. Cl.
    USPC ........ 525/326.2; 522/116; 522/117; 522/126; 522/151; 522/159; 522/160; 522/156; 526/255
(58) Field of Classification Search
    USPC ............... 525/199, 326.2, 426; 522/116, 117, 522/149, 156, 126
    See application file for complete search history.

(56) References Cited

U.S. PATENT DOCUMENTS

| | | | |
|---|---|---|---|
| 3,188,165 A | 6/1965 | Magat et al. | |
| 3,298,942 A | 1/1967 | Magat et al. | |
| 3,666,693 A | 5/1972 | Chapiro et al. | |
| 4,129,617 A | 12/1978 | Machi et al. | |
| 4,179,401 A | 12/1979 | Garnett et al. | |
| 4,220,511 A | 9/1980 | Derbyshire | |
| 4,385,130 A | 5/1983 | Molinski et al. | |
| 4,652,592 A | 3/1987 | Kawashima et al. | |
| 5,075,342 A | 12/1991 | Ishigaki et al. | |
| 5,087,936 A | 2/1992 | Ogata et al. | |
| 5,169,675 A | 12/1992 | Bartoszek-Loza et al. | |
| 5,444,103 A | 8/1995 | Tabata et al. | |
| 5,576,106 A * | 11/1996 | Kerbow et al. | 428/403 |
| 5,756,199 A | 5/1998 | Kerbow et al. | |
| 6,216,842 B1 * | 4/2001 | Beale et al. | 193/20 |
| 6,225,368 B1 | 5/2001 | D'Agostino et al. | |
| 6,387,964 B1 | 5/2002 | D'Agostino et al. | |
| 6,770,378 B1 | 8/2004 | Lehmann | |
| 6,824,872 B2 | 11/2004 | Coates et al. | |
| 7,276,561 B2 * | 10/2007 | Yoshida et al. | 525/276 |
| 7,759,441 B2 | 7/2010 | Lehmann et al. | |
| 7,790,780 B2 | 9/2010 | Lehmann et al. | |
| 2003/0008935 A1 * | 1/2003 | Yamamoto et al. | 522/114 |
| 2003/0199639 A1 | 10/2003 | Coates et al. | |
| 2004/0033358 A1 | 2/2004 | Coates et al. | |
| 2007/0244212 A1 | 10/2007 | Lehmann | |
| 2007/0282031 A1 | 12/2007 | Lehmann et al. | |
| 2010/0298461 A1 | 11/2010 | Lehmann et al. | |

FOREIGN PATENT DOCUMENTS

| | | |
|---|---|---|
| DE | 146716 | 10/1979 |
| DE | 2005-312 | 5/1983 |
| DE | 19823609 | 12/1999 |
| FR | 2318896 | 2/1977 |
| FR | 2494702 | 5/1982 |
| GB | 1495297 | 12/1977 |
| GB | 1516648 | 7/1978 |
| JP | 62-036431 | 2/1987 |
| JP | 62036431 A * | 2/1987 |
| JP | 63-007455 | 1/1988 |
| JP | 2-072771 | 3/1990 |
| JP | 2002-338931 | 11/2002 |
| JP | 2002338931 A * | 11/2002 |
| JP | 2004-107461 | 4/2004 |
| JP | 2004/081546 | 9/2004 |
| WO | 96/03448 | 2/1996 |

(Continued)

OTHER PUBLICATIONS

Machine translation of Nishi et al., JP 2002-338931 A, translated on Feb. 27, 2009.*
Translation of Hamaoka, JP 62036431A, translated on Mar. 2009.*
Drobny, Technology of Fluoropolymers, 2001, CRC Press LLC, pp. 8-9 and 60-63.

(Continued)

Primary Examiner — Nicole M Buie-Hatcher
(74) Attorney, Agent, or Firm — Greenblum & Bernstein, P.L.C.

(57) ABSTRACT

The invention relates to the field of chemistry and relates to radically coupled PTFE polymer compounds that can be used, for example, as tribo materials, and a method for the production thereof. The object of the invention is to disclose radically coupled PTFE polymer compounds which exhibit improved wear resistances with comparable gliding properties, and furthermore a simple and efficient method for the production of such compounds. The object is attained through radically coupled PTFE polymer compounds comprising radiation-chemically and/or plasma-chemically modified PTFE powders, on the particle surface of which olefinically unsaturated polymers are chemically radically coupled by a reactive conversion into a melt. The object is further attained through a method for producing radically coupled PTFE polymer compounds, in which PTFE powders are reactively converted with reactive perfluoroalkyl-(peroxy) radical centers after a radiation-chemical and/or plasma-chemical modification into a melt with the addition of olefinically unsaturated polymers.

4 Claims, No Drawings

(56) References Cited

FOREIGN PATENT DOCUMENTS

| | | |
|---|---|---|
| WO | 99/61527 | 12/1999 |
| WO | 2004/081546 | 9/2004 |
| WO | 2005/042596 | 5/2005 |
| WO | 2005/042597 | 5/2005 |

OTHER PUBLICATIONS

Schierholz et al., "Temperature Influence on the Stability and Chemical Composition of Electron Beam-Irradiated Polytetraflurooethylene," Journal of Polymer Science, Part B: Polymer Physics, 1999, vol. 37, Issue 17, pp. 2404-2411.

A. Heger et al., Technologie der Strahlenchemie an Polymeren, Akademie-Verlag Berlin 1990, 463-488 and 496-501.

Ferse et al., Plaste u. Kautschuk, 29 (1982), 45-465.

K. Schierholz et al., J. Polym. Sci. Part B, Polymer Physics, vol. 37, 2404-2411 (1999).

Dargaville et al., "High Energy Radiation Grafting of Fluoropolymers," Prog. Poly. Sci. 28 (2003) 1355-1376.

Patent Abstracts of Japan, vol. 011, No. 222 (C-435), Jul. 18, 1987.

Patent Abstracts of Japan, vol. 2003, No. 03, May 5, 2003.

Patent Abstracts of Japan, vol. 014, No. 252 (E-0934), May 20, 1990.

D.-W. Lee, "Ionisierende Strahlen Machen PTFE-Abefalle Wiederverwertbar," Kunststoffe, vol. 84, pp. 277-278, and 280 (1994) and English translation.

* cited by examiner

RADICALLY COUPLED PTFE POLYMER COMPOUNDS AND METHOD FOR THE PRODUCTION THEREOF

CROSS-REFERENCE TO RELATED APPLICATIONS

This application is a continuation of application Ser. No. 10/577,619 which is a national stage of PCT/EP2004/052619, filed Oct. 22, 2004, which claims priority to German Application No. 103 51 814.2, filed Oct. 30, 2003. The disclosures of application Ser. Nos. 10/577,619 and PCT/EP2004/052619 are incorporated by reference herein in their entireties.

The invention relates to the field of chemistry and relates to radically coupled polytetrafluoroethylene (PTFE) polymer compounds that can be used, for example as tribo materials, and a method for the production thereof.

"In the search for polymer materials appropriate for building nuclear reactors, it was determined that PTFE, in contrast to its high chemical and thermal stability, is extraordinarily sensitive to radiation. Under inert conditions as well as in the present of oxygen, it even decomposes at low absorbed doses, becomes brittle even at 0.2 to 0.3 kGy and crumbly at <100 kGy.

Beginning at approximately 360° C., the purely radiochemical decomposition is noticeably overlaid by a thermal decomposition.

Due to the stochastic progression of the radiochemical decomposition, reaction products form with a wide spectrum of chain lengths.

If PTFE is irradiated in the presence of oxygen, peroxy and alkoxy radicals are formed from the perfluoroalkyl radicals that initially formed.

In the course of the intermediate stage of the formation of the alkoxy radical, the perfluoroalkyl radical end group is decomposed in stages by shortening the chains and formation of carbonyldifluoride.

In contrast, perfluoroalkanic acid fluorides and perfluoroalkyl radical end groups form from the alkoxy radical side groups.

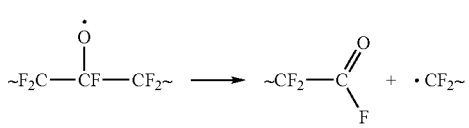
(9.22)

Unsintered and unpressed PTFE emulsion and suspension polymers are of a fibrous-felted character. A transfer, for example, of the anti-adhesive and sliding characteristics of PTFE to other media by integration into aqueous or organic dispersions, polymers, dyes, lacquers, resins, or lubricants is not possible because this PTFE cannot be homogenized, but rather tends to form clumps, agglomerates, floods, or settles.

By means of the effect of high-energy radiation with an absorbed dose of approximately 100 kGy, a pourable fine powder is obtained from the fibrous-felted polymers as a result of the partial decomposition of the polymer chains. This powder still contains loose agglomerates that can be easily separated into primary particles with a particle diameter of <5 gm. In the case of irradiation in the presence of reactants, functional groups are formed into the polymer. If the irradiation occurs in air, then according to Eq. (9.22) (and subsequent hydrolysis of the —COF groups by means of moisture in the air), carboxyl groups result. If, before irradiation, $(NH_4)_2SO_3$ is mixed in, then groups containing S are to be attained. These functional groups reduce the hydrophobia and organophobia of the PTFE so substantially that the resulting fine powder can be easily homogenized with other media. The positive characteristics of PTFE, such as its excellent gliding, separating, and dry lubrication characteristics as well as its high chemical and thermal stability, are maintained. Carboxyl and sulfonic acid groups to which perfluorized chains are connected also have a high degree of chemical inertness.

Because of the insolubility of the PTFE and its decomposition products (with the exception of the very low-molecular products), the conventional methods of determining molar mass cannot be used. The determination of molar mass must occur in an indirect manner." [A. Heger et al., Technologie der Strahlenchemie an Polymeren, Akademie-Verlag Berlin 1990].

The incompatibility with other materials often has a negative effect. By chemically activating PTFE using the known methods with (1) sodium amide in liquid ammonia and (2) alkali alkyl and alkali aromatic compounds in aprotic inert solvents, a modification can be achieved. By means of these modifications, boundary surface interactions can be achieved that are reactive or even only improved by adsorptive forces.

Recycling of the products of PTFE decomposition occurs in various fields of use, also as an additive to plastics for the purpose of achieving gliding or anti-adhesive characteristics. The fine powder substances are more or less finely dispersed as filler components in a matrix [Ferse et al., Plaste u. Kautschuk, 29 (1982), 458; Ferse et al. DD-PS 146 716 (1979)]. In releasing the matrix components, the PTFE fine powder can be eliminated and/or is recovered.

Although, in the areas of use of PTFE fine powder, an improvement of the characteristics is achieved as compared to the commercial fluorocarbon-free additives, the incompatibility, the insolubility, the intercalation, and also heterogeneous distribution is disadvantageous for many areas of use.

Furthermore, grafted plastics containing fluorine are known (U.S. Pat. No. 5,576,106) comprising plastic particles containing fluorine, on the surface of which a non-homopolymerized ethylenically unsaturated compound is grafted. The non-homopolymerized ethylenically unsaturated compounds can thereby be acids, esters or anhydrides.

These grafted plastics containing fluorine are produced by exposing the plastic powder containing fluorine to a source of ionizing radiation in the presence of the ethylenically unsaturated compound. The bonding of the ethylenically unsaturated compounds thereby occurs on the surface of the plastic particles containing fluorine.

The object of the invention is to disclose radically coupled PTFE polymer compounds that exhibit improved wear resistances with comparable gliding properties and the durability of the parts of this compound is thus increased, and furthermore a simple and efficient method for producing such compounds.

The object is attained through the invention described in the claims. Further developments are the subject matter of the subordinate claims.

The radically coupled PTFE polymer compounds according to the invention comprise radiation-chemically or plasma-chemically modified PTFE powders, on the particle surface of which olefinically unsaturated polymers are radically coupled via a reactive conversion into a melt.

The bonding site of the olefinically unsaturated polymers with the PTFE particle surface is thereby advantageously randomly distributed on the polymer chain.

Advantageously, the PTFE powder is radiation-chemically modified.

Likewise advantageously, the PTFE powder is radiation-chemically modified with a radiation dose greater than 50 kGy and preferably with a radiation dose greater than 100 kGy.

It is also advantageous for the PTFE powder to be radiation-chemically modified in the presence of reactants, preferably under the influence of oxygen.

Furthermore advantageously, as olefinically unsaturated polymers those polymers are radically coupled which have olefinically unsaturated groups in the main chain and/or in the side chain.

Such advantageous olefinically unsaturated polymers are radically coupled SBS, ABS, SBR, NBR, NR and other butadiene and/or isoprene-homo-, -co- or -ter-polymers.

With the method according to the invention for producing radically coupled. PTFE polymer compounds, PTFE powders are reacted with reactive perfluoroalkyl-(peroxy) radical centers after a radiation-chemical and/or plasma-chemical modification into a melt with the addition of olefinically unsaturated polymers.

Advantageously, radiation-chemically modified PTFE powder is used.

Likewise advantageously, PTFE powder is used which has been radiation-chemically modified with a radiation dose greater than 50 kGy and preferably with a radiation dose greater than 100 kGy.

It is also advantageous if PTFE powder is radiation-chemically modified in the presence of reactants, preferably under the influence of oxygen.

It is also advantageous if the PTFE powder is used as micropowder.

It is also advantageous if the reaction into melt is realized in a melt mixer, preferably in an extruder.

Furthermore advantageously, as olefinically unsaturated polymers those polymers are used that have olefinically unsaturated groups in the main chain and/or in the side chain.

styrene-butadiene-styrene block copolymer (SBS), acrylonitrile-butadiene-styrene copolymer (ABS), styrene butadiene rubber (SBR), nitrile butadiene rubber NBR), natural rubber (NR) and other butadiene- and/or isoprene-homo-, -co- or -ter-polymers are used as such advantageous olefinically unsaturated polymers.

The radical coupling according to the invention of PTFE micropowders with olefinically unsaturated polymers via a (melt) modification reaction leads to compatibilization and fixed integration into a matrix, which can be advantageously utilized for tribo materials. Thus special thermoplastics, elastomers and special thermosets can be modified with PTFE via reactive conversion/extrusion such that in addition to a comparable sliding friction an increased wear resistance is achieved, compared to the pure base materials and the physical mixtures with PTFE.

In the advantageously radiation-chemical modification of PTFE to PTFE micropowders, preferably persistent (long-lived) reactive perfluoroalkyl-(peroxy) radical centers are formed, which surprisingly are capable of coupling with olefinically unsaturated polymers in a reactive conversion. With a plasma treatment, superficially similar reactive perfluoroalkyl-(peroxy) radical centers can be produced and used for this coupling reaction; however, these reactive perfluoroalkyl-(peroxy) radical centers are not optimal in their distribution and density compared to the reactive perfluoroalkyl-(peroxy) radical centers produced radiation-chemically. Thus, after the melt modification in the laboratory kneader for SBS, ABS and olefinically unsaturated elastomers such as, e.g., SBR, NBR, NR, polybutadiene, etc., with radiation-chemically modified PTFE (micro) powder and after the separation of the uncombined matrix, a chemical coupling could be proven by means of infrared spectroscopy, i.e., the polymers were no longer detachable from the PTFE (micro) powder via extraction, compared to physical mixtures in which the PTFE could be separated quantitatively unchanged.

The radical coupling of the PTFE according to the invention and the incorporation/compatibilization into a matrix that thus occurred leads to an improvement of the material properties and the sliding friction properties and to the increase of the wear resistance compared to the unmodified base materials and the physical mixtures with PTFE. To improve the wear resistance it is further advantageous to utilize the chemically coupled PTFE particles simultaneously as storage medium for the PFPE additive (PFPE=perfluoropolyether) that is incompatible with the polymer matrix and helps to reduce the friction coefficient while at the same time increasing wear resistance.

The radically coupled PTFE polymer compounds are produced according to the invention in that, for example, a PTFE emulsion polymer (TF 2025 from Dyneon) is irradiated with 200 kGy and a PTFE suspension polymer (TF 1750 from Dyneon) is irradiated in air with 500 kGy. During the irradiation in 50-kGy steps with decomposition to PTFE micropowder, reactive perfluoroalkyl-(peroxy) radical centers are produced, which in the presence of air convert partially into relatively stable/long-lived peroxy radicals.

According to the prior art it is known that these PTFE (micro) powders can be tempered. The reactive perfluoroalkyl-(peroxy) radical centers are thus destroyed particularly at rising temperatures [K. Schierholz et al., J. Polym. Sci. Part B, Polymer Physics, Vol. 37, 2404-2411 (1999)].

With the method according to the invention, PTFE (micro) powders are used with the reactive perfluoroalkyl-(peroxy) radical centers formed.

The reactive perfluoroalkyl-(peroxy) radical centers are used in a targeted manner for the coupling with olefinically unsaturated polymers in that the chemically coupled PTFE polymer compounds are formed in the melt modification reaction/reactive extrusion via a radical coupling.

It was not possible to realize such a coupling of olefinically unsaturated polymers on the surface of PTFE powder particles before the invention.

Through the chemical coupling, these products exhibit improved mechanical and tribological properties. These products are primarily of interest for sliding friction processes. Through the radical modification/compatibilization of the PTFE particle with the matrix material, a good bond and an improvement of the wear resistance is achieved, since the PTFE grain cannot be ground out of the matrix material with mechanical loading. Since the PTFE grain is in direct interaction with the matrix, compared to the physical mixtures, improved material properties are also observed, depending on the degree of bonding.

With the chemical coupling of the PTFE in the matrix new materials are obtained that exhibit improved wear resistances, i.e., increased durability in the applications, with comparable sliding friction coefficients. Furthermore, a further reduction of the sliding friction coefficients and a noticeable improvement of the wear resistance is obtained through the addition of PFPE, whereby the chemically coupled PTFE additionally acts as a storage medium.

The invention is described below in more detail on the basis of several exemplary embodiments.

COMPARATIVE EXAMPLE 1

Melt Modification of SBS with PTFE Micropowder, Unirradiated 40 g SBS (Cariflex TR 1102 S, stabilized) is melted at 160° C. in the laboratory kneader at 60 rpm. After 3 minutes 20 g thermally decomposed PTFE polymer (TF 9205 from Dyneon, unirradiated) is incorporated. 5 minutes after the addition of PTFE, the test is interrupted and the material is removed from the kneader chamber. The SBS matrix material is separated from the PTFE solid product through solution in methylene chloride and centrifuging. The solid product/residue is slurried again with methylene chloride. The solution/extraction and centrifuging was repeated 4 times, then the PTFE solid product was separated and dried.

The infrared spectroscopic evaluation of the separated, purified PTFE micropowder yielded no chemically coupled PTFE-SBS material. No SBS absorptions were found in the infrared spectrum. This physical PTFE-SBS mixture serves as the standard for the measurement of the sliding friction coefficient and wear resistance within the scope of the tribological examinations.

EXAMPLE 1

Melt modification of SBS with PTFE emulsion polymer, irradiated with 500 kGy

Experimental procedure and separation of the polymer matrix was carried out analogously to comparative example 1; however, 20 g PTFE emulsion polymer (TF 2025 from Dyneon) was used, which was irradiated with 500 kGy.

The infrared spectroscopic examination of the separated and purified PTFE micropowder resulted in very high SBS absorptions in addition to those of the PTFE as proof of chemically coupled PTFE-SBS material. In comparative example 1 (physical mixture) only pure PTFE was detectable in the infrared spectrum.

The tribological examinations showed that the chemically coupled PTFE-SBS material exhibits a comparable friction coefficient to the physical mixture, but that a considerably increased wear resistance is observed. The wear in the block/ring test with the chemically coupled material shows a reduction to 35% compared to the physical mixture (comparative example 1).

EXAMPLE 2

Melt Modification of SBS with PTFE Suspension Polymer, Irradiated with 500 kGy

Performance of the test and separation of the polymer matrix was carried out analogously to comparative example 1; however, 20 g PTFE suspension polymer (TF 1750 from Dyneon) was used, which was irradiated with 500 kGy.

The infrared spectroscopic examination of the separated and purified PTFE micropowder yielded high SBS absorptions in addition to those of the PTFE as proof of chemically coupled PTFE-SBS material. In comparative example 1 (physical mixture) only pure PTFE was detectable in the infrared spectrum.

The tribological examinations showed that the chemically coupled PTFE-SBS material shows a comparable sliding friction coefficient to the physical mixture, but that a considerably increased wear resistance is observed. The wear in the block/ring test with the chemically coupled material shows a reduction to 48% compared to the physical mixture (comparative example 1).

COMPARATIVE EXAMPLE 2

Melt Modification of SBR with PTFE Micropowder, Unirradiated 40 g SBR elastomer, chopped, is kneaded at 140° C. in the laboratory kneader at 60 rpm. After 2 minutes, 20 g thermally decomposed PTFE polymer (TF 9205 from Dyneon, unirradiated) is incorporated. 5 minutes after the addition of PTFE, the test is interrupted and the material is removed from the kneader chamber. The SBS matrix material is separated from the PTFE solid product by solution in methylene chloride and centrifuging. The solid product/residue is slurried with methylene chloride again. The solution/extraction and centrifuging was repeated 4 times, then the PTFE solid product was separated and dried.

The infrared spectroscopic examination of the separated purified PTFE micropowder yielded no chemically coupled PTFE-SBR material. No SBR absorptions were found in the infrared spectrum. This physical PTFE-SBR mixture serves after vulcanization as the standard for the measurement of the sliding friction coefficient and the wear resistance within the scope of the tribological examinations.

EXAMPLE 3

Melt Modification of SBR with PTFE Emulsion Polymer, Irradiated with 500 kGy

Performance of the test and separation of the polymer matrix was carried out analogously to comparative example 2; however, 20 g PTFE emulsion polymer (TF 2025 from Dyneon) was used that was irradiated with 500 kGy.

The infrared spectroscopic examination of the separated and purified PTFE micropowder showed very high SBR absorptions in addition to those of the PTFE as proof of chemically coupled PTFE-SBR material. In comparative example 2 (physical mixture), only pure PTFE was detectable in the infrared spectrum.

The tribological examinations were carried out on vulcanized test samples—the examinations showed that the chemically coupled PTFE-SBR material shows a comparable sliding friction coefficient to the physical mixture (comparative example 2), but that a considerably increased wear resistance is observed. The wear in the block/ring test showed a reduction to 30%.

As further tribological examination, shortly before the laboratory kneader test was interrupted, 0.5% by weight PFPE (perfluoropolyether, DuPont) was added, which showed that the vulcanized test samples sliding friction coefficients shows a value approx. 30% lower compared to the physical mixture (comparative example 2) and that an increase in wear resistance is observed. The wear in the block/ring test showed a reduction to 15%.

EXAMPLE 4

Melt Modification of SBR with PTFE Suspension Polymer, Irradiated with 500 kGy

Performance of the test and separation of the polymer matrix was carried out analogously to comparative example 2; however, 20 g PTFE suspension polymer (TF 1750 from Dyneon) was used, which was irradiated with 500 kGy.

The infrared spectroscopic examination of the separated and purified PTFE micropowder showed high SBR absorptions in addition to those of the PTFE as proof of chemically coupled PTFE-SBR material. In comparative example 2 (physical mixture), only pure PTFE was detectable in the infrared spectrum.

The tribological examinations were carried out on vulcanized test samples. The examinations showed that the chemically coupled PTFE-SBR material has a comparable sliding friction coefficient to the physical mixture (comparative example 2), but that a considerably increased wear resistance is observed. The wear in the block/ring test showed a reduction to 43%.

As further tribological examination, shortly before the laboratory kneader test was interrupted, 0.5% by weight PFPE (perfluoropolyether, DuPont) was added, which showed that the vulcanized test samples sliding friction coefficients shows a value approx. 30% lower compared to the physical mixture (comparative example 2) and that an increase in wear resistance is observed. The wear in the block/ring test showed a reduction to 18%.

COMPARATIVE EXAMPLE 3

Melt Modification of ABS with PTFE Micropowder, Unirradiated 40 g ABS is melted at 210° C. in the laboratory kneader at 80 rpm. After 3 minutes 20 g thermally decomposed PTFE polymer (IF 9205, from Dyneon, unirradiated) is incorporated. 5 minutes after the addition of the PTFE, the test is interrupted and the material removed from the kneader chamber. The ABS matrix material is separated from the PTFE solid product by solution in methylene chloride and centrifuging. The solid product/residue is slurried again with methylene chloride. The solution/extraction and centrifuging was repeated 4 times, then the PTFE solid product was separated and dried.

The infrared spectroscopic evaluation of the separated and purified PTFE micropowder yielded no chemically coupled PTFE-ABS material. No ABS absorptions were found in the infrared spectrum. This physical PTFE-ABS mixture serves as the standard for the measurement of the sliding friction coefficient and the wear resistance within the scope of the tribological examinations.

EXAMPLE 5

Melt Modification of ABS with PTFE Emulsion Polymer, Irradiated with 500 kGy

Performance of the test and separation of the polymer matrix was carried out analogously to comparative example 3; however, 20 g PTFE emulsion polymer (IF 2025 from Dyneon) was used, which was irradiated with 500 kGy.

The infrared spectroscopic examination of the separated and purified PTFE micropowder showed very high ABS absorptions in addition to those of the PTFE as proof of chemically coupled PTFE-ABS material. In comparative example 3 (physical mixture), only pure PTFE was detectable in the infrared spectrum.

The tribological examinations showed that the chemically coupled PTFE-ABS material has a comparable sliding friction coefficient to the physical mixture, but that a considerably increased wear resistance is observed. The wear in the block/ring test with the chemically coupled material shows a reduction to 50% compared to the physical mixture (comparative example 3).

EXAMPLE 6

Melt Modification of ABS with PTFE Suspension Polymer Irradiated with 500 kGy

Performance of the test and separation of the polymer matrix was carried out analogously to comparative example 3; however, 20 g PTFE suspension polymer (TF 1750 from Dyneon) was used, which was irradiated with 500 kGy.

The infrared spectroscopic examination of the separated and purified PTFE micropowder showed high ABS absorptions in addition to those of the PTFE as proof of chemically coupled PTFE ABS material. In comparative example 3 (physical mixture), only pure PTFE was detectable in the infrared spectrum.

The tribological examinations showed that the chemically coupled PTFE-ABS material has a comparable sliding friction coefficient to the physical mixture, but that a considerably increased wear resistance is observed. The wear in the block/ring test with the chemically coupled material shows a reduction to 55% compared to the physical mixture (comparative example 3).

COMPARATIVE EXAMPLE 4

Melt Modification of NBR with PTFE Micropowder, Unirradiated 40 g NBR elastomer, chopped, is kneaded at 140° C. in the laboratory kneader at 50 rpm. After 2 minutes 20 g thermally decomposed PTFE polymer (TF 9205, from Dyneon, unirradiated) is incorporated. 5 minutes after the addition of the PTFE, the test is interrupted and the material removed from the kneader chamber. The NBR matrix material is separated from the PTFE solid product by solution in methylene chloride and centrifuging. The solid product/residue is slurried again with methylene chloride. The solution/extraction and centrifuging was repeated 4 times, then the PTFE solid product was separated and dried.

The infrared spectroscopic evaluation of the separated purified PTFE micropowder yielded no chemically coupled PTFE-NBR material. No NBR absorptions were found in the infrared spectrum. This physical PTFE-NBR mixture serves after vulcanization as the standard for the measurement of the sliding friction coefficient or the wear resistance within the scope of the tribological examinations.

EXAMPLE 7

Melt Modification of NBR with PTFE Emulsion Polymer, Irradiated with 500 kGy

Performance of the test and separation of the polymer matrix was carried out analogously to comparative example 4; however, 20 g PTFE emulsion polymer (TF 2025 from Dyneon) was used, which was irradiated with 500 kGy.

The infrared spectroscopic examination of the separated and purified PTFE micropowder showed very high NBR absorptions in addition to those of the PTFE as proof of chemically coupled PTFE-NBR material. In comparative example 4 (physical mixture), only pure PTFE was detectable in the infrared spectrum.

The tribological examinations were carried out on vulcanized test samples. The examinations showed that the chemically coupled PTFE-SBR material has a comparable sliding friction coefficient to the physical mixture (comparative example 4), but that a considerably increased wear resistance is observed. The wear in the block/ring test showed a reduction to 35%.

As further tribological examination, shortly before the laboratory kneader test was interrupted, 0.5% by weight PFPE (perfluoropolyether, DuPont) was added, which showed that the vulcanized test samples sliding friction coefficients shows a value approx. 40% lower compared to the physical mixture (comparative example 4) and that an increase in wear resistance is observed. The wear in the block/ring test showed a reduction to 15%.

EXAMPLE 8

Melt Modification of NBR with PTFE Suspension Polymer, Irradiated with 500 kGy

Performance of the test and separation of the polymer matrix was carried out analogously to comparative example 4; however, 20 g PTFE suspension polymer (TF 1750 from Dyneon) was used, which was irradiated with 500 kGy.

The infrared spectroscopic examination of the separated and purified PTFE micropowder showed high NBR absorptions in addition to those of the PTFE as proof of chemically coupled PTFE-NBR material. In comparative example 4 (physical mixture), only pure PTFE was detectable in the infrared spectrum.

The tribological examinations were carried out on vulcanized test samples. The examinations showed that the chemically coupled PTFE-SBR material has a comparable sliding friction coefficient to the physical mixture (comparative example 4), but that a considerably increased wear resistance is observed. The wear in the block/ring test showed a reduction to 42%.

As further tribological examination, shortly before the laboratory kneader test was interrupted, 0.5% by weight PFPE (perfluoropolyether, DuPont) was added, which showed that the vulcanized test samples sliding friction coefficients shows a value approx. 30% lower compared to the physical mixture (comparative example 4) and that an increase in wear resistance is observed. The wear in the block/ring test showed a reduction to 18%.

EXAMPLE 9

Melt Modification of SBS with Plasma-Modified PTFE Micropowders 40 g SBS (Cariflex TR 1102 S, stabilized) is melted at 160° C. in the laboratory kneader at 60 rpm. After 3 minutes 20 g plasma-treated PTFE (TF 9205, thermally decomposed, Dyneon, modified with oxygen plasma) is incorporated. 5 minutes after the addition of the PTFE, the test is interrupted and the material removed from the kneader chamber. The SBS matrix material is separated from the PTFE solid product by solution in methylene chloride and centrifuging. The solid product/residue is slurried again with methylene chloride. The solution/extraction and centrifuging was repeated 4 times, then the PTFE solid product was separated and dried. The infrared spectroscopic evaluation of the separated purified PTFE micropowder yielded SBS absorptions in addition to those of the PTFE, which proves chemically coupled PTFE-SBS material. In comparative example 1, i.e., in the test with unirradiated PTFE micropowder (physical mixture), only pure PTFE was detectable in the infrared spectrum.

The tribological examinations showed that the chemically coupled PTFE-SBS materials of this example show comparable sliding friction coefficients to the physical mixture, but that an increased wear resistance is observed. The wear in the block/ring test with the chemically coupled material shows a reduction of wear by 20% to 35% compared to the physical mixture (comparative example 1).

What is claimed is:

1. Radically coupled polytetrafluoroethylene polymer compound comprising radiation-chemically modified polytetrafluoroethylene micropowder with a radiation dose greater than 50 kGy under the influence of oxygen, the radiation-chemically modified polytetrafluoroethylene micropowder including a surface, and at least one olefinically unsaturated polymer chemically radically coupled on the surface of the radiation-chemically modified polytetrafluoroethylene micropowder via a reactive conversion into melt, wherein the at least one olefinically unsaturated polymer includes olefinically unsaturated groups in at least one of main chain or side chain of the at least one olefinically unsaturated polymer and the at least one olefinically unsaturated polymer is styrene-butadiene-styrene block copolymer, acrylonitrile-butadiene-styrene copolymer, styrene butadiene rubber, nitrile butadiene rubber, and/or natural rubber.

2. The radically coupled polytetrafluoroethylene polymer compound according to claim 1, wherein bonding site of the at least one olefinically unsaturated polymer with the surface is randomly distributed on the polymer chain.

3. The radically coupled polytetrafluoroethylene polymer compound according to claim 1, wherein the polytetrafluoroethylene powder is radiation-chemically modified with a radiation dose greater than 100 kGy.

4. The radically coupled polytetrafluoroethylene polymer compound according to claim 1, wherein the polytetrafluoroethylene powder is radiation-chemically modified in presence of reactants in addition to the oxygen.

* * * * *